(12) United States Patent
Higuchi

(10) Patent No.: US 7,551,065 B2
(45) Date of Patent: Jun. 23, 2009

(54) VEHICLE ANTITHEFT APPARATUS

(75) Inventor: Hirofumi Higuchi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 354 days.

(21) Appl. No.: 11/638,371

(22) Filed: Dec. 14, 2006

(65) Prior Publication Data

US 2007/0139170 A1    Jun. 21, 2007

(30) Foreign Application Priority Data

Dec. 15, 2005    (JP)    ............................. 2005-362212

(51) Int. Cl.
 *B60R 25/10*    (2006.01)
(52) U.S. Cl. ................. 340/426.1; 340/429; 340/426.11
(58) Field of Classification Search .............. 340/426.1, 340/426.11, 429
  See application file for complete search history.

(56) References Cited

U.S. PATENT DOCUMENTS

| | | | |
|---|---|---|---|
| 4,993,688 A * | 2/1991 | Mueller et al. ............... 254/423 |
| 5,224,688 A * | 7/1993 | Torres et al. ................. 254/423 |
| 5,424,712 A * | 6/1995 | Rosenberger ........... 340/426.26 |
| 6,029,102 A | 2/2000 | Elsman | |
| 6,087,935 A | 7/2000 | Berner et al. | |
| 6,404,073 B1 * | 6/2002 | Chiang ....................... 307/10.1 |
| 2008/0173106 A1 * | 7/2008 | Hanazawa et al. ...... 73/862.626 |

FOREIGN PATENT DOCUMENTS

| | | |
|---|---|---|
| DE | 92 17 182 U1 | 6/1993 |
| DE | 43 32 278 A1 | 3/1995 |
| DE | 295 06 220 U1 | 3/1996 |
| DE | 197 08 306 A1 | 10/1997 |
| DE | 197 00 190 A1 | 7/1998 |
| EP | 0 146 328 | 6/1985 |
| FR | 2 745 249 | 8/1997 |
| JP | A-6-211108 | 8/1994 |
| JP | 2006076546 A * | 3/2006 |
| WO | WO 94/13513 | 6/1994 |

OTHER PUBLICATIONS

Office Action issued from the German Patent Office dated on May 6, 2008 for the corresponding German patent application No. 10 2006 058 899.1.

* cited by examiner

*Primary Examiner*—Toan N Pham
*Assistant Examiner*—Travis R Hunnings
(74) *Attorney, Agent, or Firm*—Posz Law Group, PLC

(57) ABSTRACT

An antitheft apparatus for a vehicle includes a theft behavior sensing device and a paint injecting device. The theft behavior sensing device senses a theft behavior to the vehicle. The paint injecting device injects paint toward at least one of an exterior and an interior of a cabin of the vehicle when the theft behavior sensing device senses the theft behavior.

3 Claims, 6 Drawing Sheets

VEHICLE ANTITHEFT APPARATUS

CROSS REFERENCE TO RELATED APPLICATION

This application is based on and incorporates herein by reference Japanese Patent Application No. 2005-362212 filed on Dec. 15, 2005.

BACKGROUND OF THE INVENTION

1. Field of the Invention

The present invention relates to an antitheft apparatus for a vehicle.

2. Description of Related Art

Conventionally, there is an antitheft apparatus for a vehicle, which takes a photograph of a theft behavior using a photographing device, such as a camera (e.g., see Japanese Unexamined Patent Publication No. H6-211108). The vehicle antitheft apparatus disclosed in Japanese Unexamined Patent Publication No. H6-211108, for example, senses a contact of a wrongdoer (e.g., thief) when the wrongdoer contacts a part of the vehicle. Then, the vehicle antitheft apparatus starts the photographing device, such as a video camera, based on the contact.

The theft behavior may be limited by starting the photographing device (e.g., video camera) disclosed in the above conventional art. However, once the vehicle is stolen, the conventional art may not recover the stolen vehicle. Also, the sole operation of the photographing device may not be effective enough to discourage the wrongdoer from stealing the vehicle.

SUMMARY OF THE INVENTION

The present invention is made in view of the above disadvantages. Thus, it is an objective of the present invention to address at least one of the above disadvantages.

To achieve the objective of the present invention, there is provided an antitheft apparatus for a vehicle, the apparatus including a theft behavior sensing device and a paint injecting device. The theft behavior sensing device senses a theft behavior to the vehicle. The paint injecting device injects paint toward at least one of an exterior and an interior of a cabin of the vehicle when the theft behavior sensing device senses the theft behavior.

To achieve the objective of the present invention, there is also provided an antitheft apparatus for a vehicle, the apparatus including a theft behavior sensing device and a vehicle vibrating device. The theft behavior sensing device senses a theft behavior to the vehicle. The vehicle vibrating device vibrates the vehicle when the theft behavior sensing device senses the theft behavior.

To achieve the objective of the present invention, there is also provided an antitheft apparatus for a vehicle, the apparatus including a theft behavior sensing device and a smoke generating device. The theft behavior sensing device senses a theft behavior to the vehicle. The smoke generating device generates smoke toward at least one of an exterior and an interior of a cabin of the vehicle when the theft behavior sensing device senses the theft behavior.

To achieve the objective of the present invention, there is also provided an antitheft apparatus for a vehicle, the apparatus including a theft behavior sensing device and an anti-jack-up device. The theft behavior sensing device senses a theft behavior to the vehicle. The anti-jack-up device that limits the vehicle from being jacked up when the theft behavior sensing device senses the theft behavior.

To achieve the objective of the present invention, there is also provided an antitheft apparatus for a vehicle, the apparatus including a theft behavior sensing device, a window display device, and a display controlling device. The theft behavior sensing device senses a theft behavior to the vehicle. The window display device has a display region on a window of the vehicle for displaying indication. The display controlling device controls the indication, which is displayed by the window display device, when the theft behavior sensing device senses the theft behavior.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

Figure 1A:
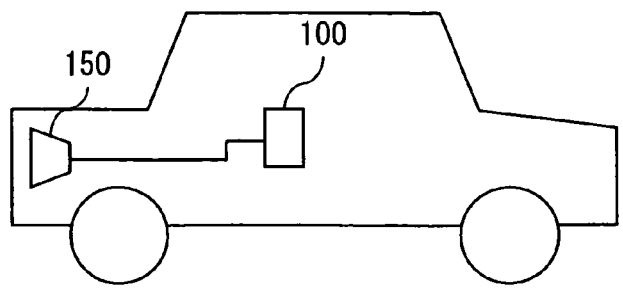
FIG. 1A is a schematic diagram of a vehicle antitheft apparatus having a theft sensing device and an injecting device according to a first embodiment of the present invention.

The first embodiment of the present invention will be described with reference to accompanying drawings. As shown in FIG. 1A, a vehicle antitheft apparatus of the present embodiment includes a theft sensing device (theft behavior sensing device) 100 and an injecting device 150. The theft sensing device 100 senses a theft behavior to a vehicle (a behavior to steal the vehicle), and outputs a sensing result to the injecting device 150. Then, the injecting device 150 operates based on the sensing result.

Figure 1B:
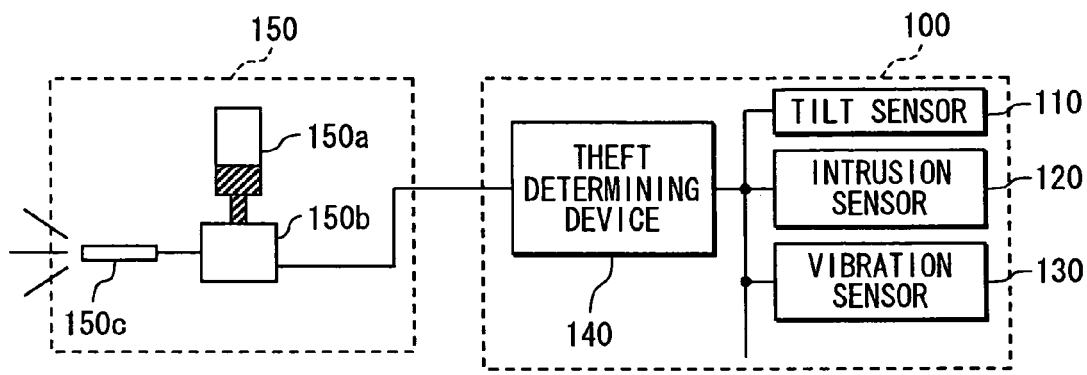
FIG. 1B is a block diagram of the theft sensing device and the injecting device shown in FIG. 1A.

FIG. 1B shows a structure of the theft sensing device 100 and the injecting device 150. The theft sensing device 100 includes a tilt sensor 110, an intrusion sensor 120, a vibration sensor 130, and a theft determining device 140. The tilt sensor 110 senses a tilt of the vehicle, and senses, for example, an amount of change in a roll angle or a pitch angle caused when the vehicle is jacked up.

The intrusion sensor 120 senses an intrusion into a cabin of the vehicle, and also senses a person, who approaches to the vehicle, for example, to try to intrude into the vehicle. Specifically, for example, an image captured by a capturing device (photographing device), such as a camera, may be analyzed to sense the intrusion into the vehicle cabin or the person approaching the vehicle. Also, a transmitted wave is transmitted to an interior and an exterior of the vehicle, and a reflected wave of the transmitted wave is used to sense the intrusion into the vehicle cabin or the person approaching the vehicle.

The vibration sensor 130 senses each vibration of the vehicle in a fore-aft direction, a right-left direction, and an up-down direction. For example, an acceleration sensor may be used for the vibration sensor 130. The theft determining device 140 senses the theft behavior of the vehicle. Typically, the theft determining device 140 senses the theft behavior by integrating the sensing results from the tilt sensor 110, the intrusion sensor 120, and the vibration sensor 130. When the theft determining device 140 senses the theft behavior, the theft determining device 140 outputs a sensing result, which indicates that the theft behavior is sensed, to the injecting device 150.

The injecting device 150 includes a paint tank 150a, an injection controlling device 150b, and a nozzle 150c. The paint tank 150a is a container storing a paint that is injected through the nozzle 150c. The paint may preferably include fluorescent paint or luminous paint, which irradiates ultraviolet rays to be luminous. This makes is easier to identify the person who conducts the theft behavior at night.

The injection controlling device 150b controls an operation such that the paint in the paint tank 150a is injected through the nozzle 150c when the sensing result of the theft determining device 140 indicates that the theft behavior is sensed. The nozzle 150c is a nozzle, through which the paint is injected, and the nozzle 150c is mounted to a blind spot, which is not seen from the person conducting the theft behavior. The blind spot may include an interior of a wheelhouse and a lower portion of a door. The person who conducted the theft behavior may be seated or try to be seated in a driver's seat of the vehicle without recognizing the nozzle 150c. Thus, by using the above nozzle 150c, the paint may be reliably injected toward the person (intruder).

Figure 1C:
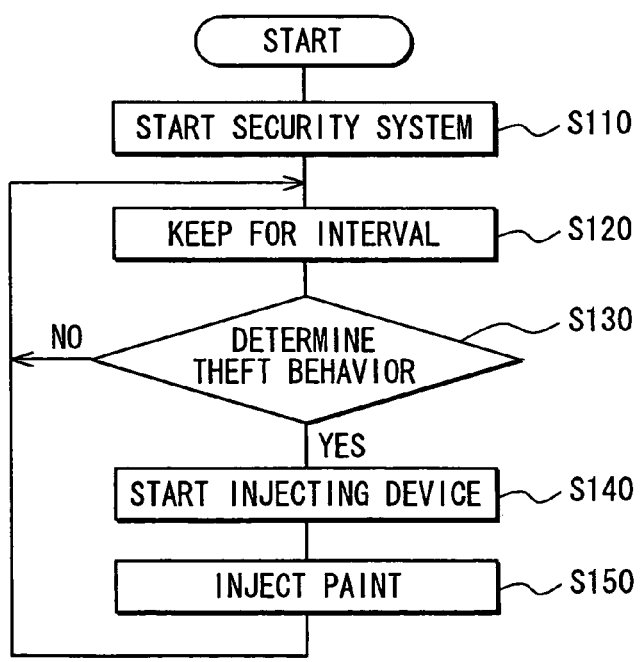
FIG. 1C is a flow chart showing an operation of the vehicle antitheft apparatus according to the first embodiment.

Next, an operation of the vehicle antitheft apparatus will be described with reference to a flow chart shown in FIG. 1C. Firstly, at step S110, the sensing of the theft behavior is started (i.e., security system is started). At step S120, the vehicle antitheft apparatus is kept on a standby for a predetermined interval. When the predetermined interval has passed, it is determined at step S130 whether the theft behavior is sensed or not. When the theft behavior is not sensed (determining result is NO), control continues with step S120 to repeat the above process.

When the theft behavior is sensed (the determining result is YES), control continues with step S140, at which the injecting device 150 is operated (started). Then, at step S150, the paint is injected through the nozzle 150c.

As discussed above, the vehicle antitheft apparatus of the present embodiment injects the paint toward the interior and the exterior of the vehicle cabin when the theft behavior is sensed.

Thus, someone, who receives the injection of the paint, can be effectively identified as the person, who conducted the theft behavior. This may effectively discourage a person from conducting the theft behavior.

Modification of the present embodiment will be described. The paint injected through the nozzle 150c may be attached to a body of the vehicle in addition to the person who conducted the theft behavior. Therefore, a device for easily removing the attached paint may be preferably provided.

Second Embodiment

Figure 2A:
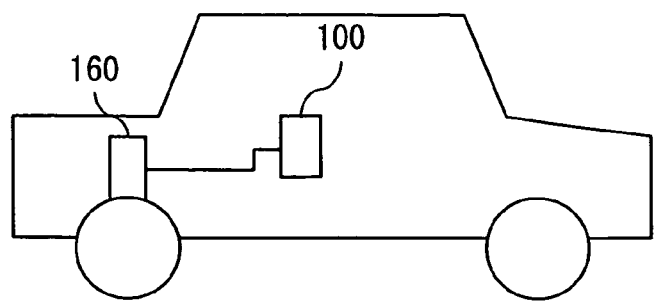
FIG. 2A is a schematic diagram of a vehicle antitheft apparatus having the theft sensing device and an oil pressure controlling device according to a second embodiment of the present invention.

The second embodiment of the present invention will be described with reference to accompanying drawings. Similar components of a vehicle antitheft apparatus of the present embodiment, which are similar to the components of the vehicle antitheft apparatus of the first embodiment, will be indicated by the same numerals. Also, explanation of the common point will be omitted and a different point from the first embodiment will be mainly described. As shown in FIG. 2A, the vehicle antitheft apparatus of the present embodiment includes the theft sensing device 100 and an oil pressure controlling device 160.

Figure 2B:
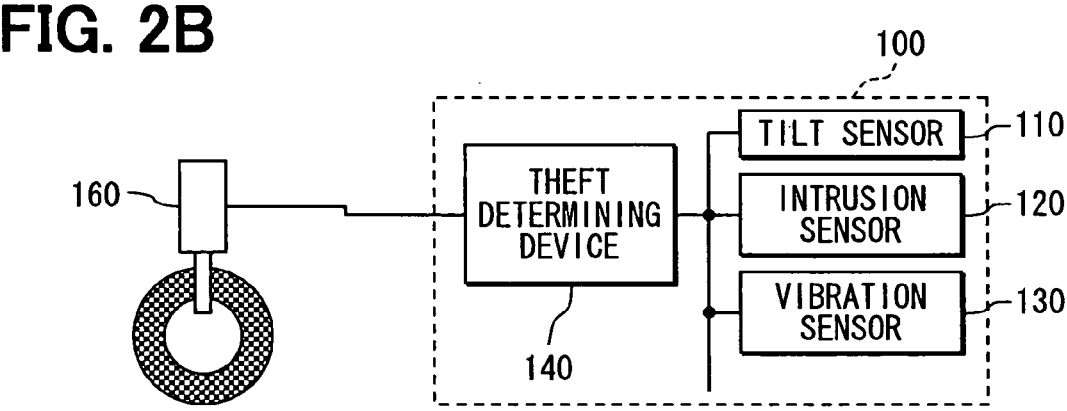
FIG. 2B is a block diagram of the theft sensing device and the oil pressure controlling device shown in FIG. 2A.

The theft sensing device 100 senses the theft behavior to the vehicle, and outputs the sensing result to the oil pressure controlling device 160. Then, the oil pressure controlling device 160 operates based on the sensing result. FIG. 2B shows a structure of the theft sensing device 100 and the oil pressure controlling device 160. The structure of the theft sensing device 100 is similar to that of the first embodiment.

The oil pressure controlling device 160 controls a suspension stroke (e.g., stroke height of a suspension) of the vehicle using an oil pressure. Thus, in a case where a controlling device for controlling the suspension stroke using the oil pressure (air pressure) is installed in the vehicle as above, the vehicle can be vibrated by using the controlling device.

The oil pressure controlling device 160 controls at least the suspension stroke for a front wheel on a driver's seat side of the vehicle to vibrate the vehicle when the sensing result of the theft determining device 140 indicates that the theft behavior is sensed. The theft person (e.g., thief), who conducts the theft behavior, is likely to firstly intrude into the driver's seat when the person intrude into the vehicle cabin. Therefore, by controlling the suspension stroke of the front wheel on the driver's seat side of the vehicle, psychological warning can be effectively provided to the theft person.

Figure 2C:
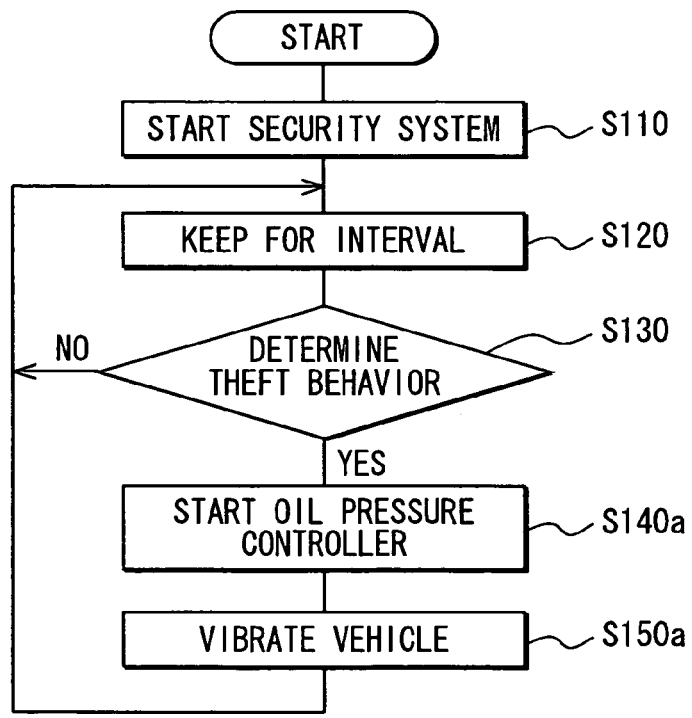
FIG. 2C is a flow chart showing an operation of the vehicle antitheft apparatus according to the second embodiment.

Next, an operation of the vehicle antitheft apparatus will be described with reference to a flow chart shown in FIG. 2C. Operations at step S110 to step S130 are similar to those in the first embodiment. When the theft behavior is sensed at step S130, the oil pressure controlling device 160 is operated (started) at step S140a, and the vehicle is vibrated at step S150a. The vibration of the vehicle body may be continued for a predetermined time such that a continuous psychological warning can be given to the theft person.

As discussed above, in the vehicle antitheft apparatus of the present embodiment, when the theft behavior is sensed, the vehicle is vibrated. Therefore, the psychological warning is given to the theft person. This may effectively discourage the person from conducting the theft behavior.

Third Embodiment

Figure 3A:
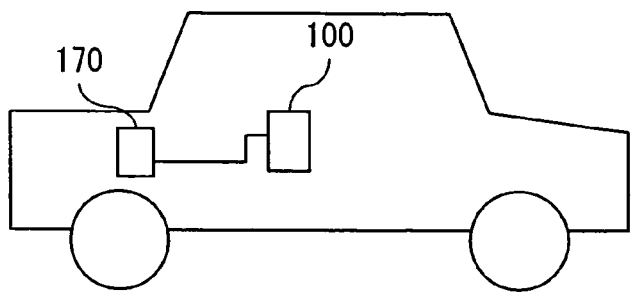
FIG. 3A is a schematic diagram of a vehicle antitheft apparatus having the theft sensing device and a smoke generating device according to a third embodiment of the present invention.

The third embodiment of the present invention will be described with reference to accompanying drawings. Similar components of a vehicle antitheft apparatus of the present embodiment, which are similar to the components of the vehicle antitheft apparatus of the first and second embodiments, will be indicated by the same numerals. Also, explanation of the common point will be omitted and a different point from the embodiments will be mainly described. As shown in FIG. 3A, the vehicle antitheft apparatus of the present embodiment includes the theft sensing device 100 and a smoke generation controlling device 170.

Figure 3B:
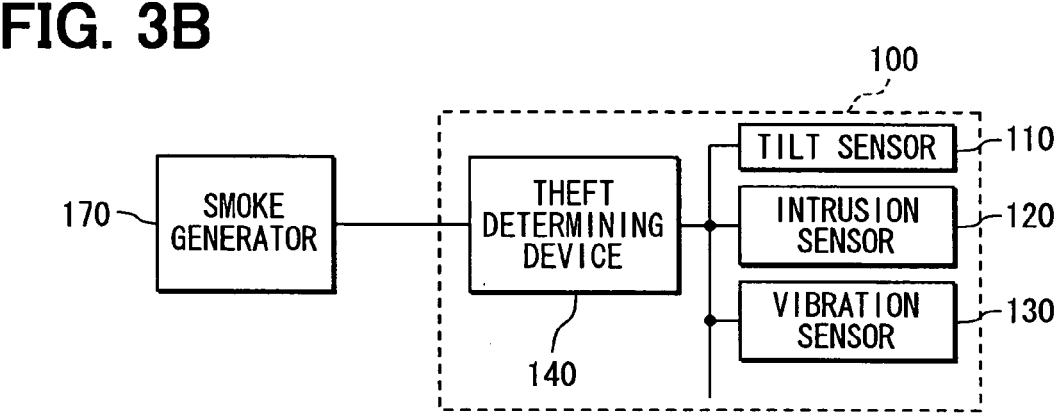
FIG. 3B is a block diagram of the theft sensing device and the smoke generating device shown in FIG. 3A.

The theft sensing device 100 senses the theft behavior to the vehicle, and outputs the sensing result to the smoke generation controlling device 170. Then, the smoke generation controlling device 170 operates based on the sensing result. FIG. 3B shows a structure of the theft sensing device 100 and the smoke generation controlling device 170. The structure of the theft sensing device 100 is similar to that of each of the first and second embodiments.

The smoke generation controlling device 170 injects smoke toward the theft person, who is seated or tries to be seated in the driver's seat of the vehicle, when the sensing result of the theft determining device 140 indicates that the theft behavior is sensed. Thus, the injection of the smoke intimidates the theft person.

Figure 3C:
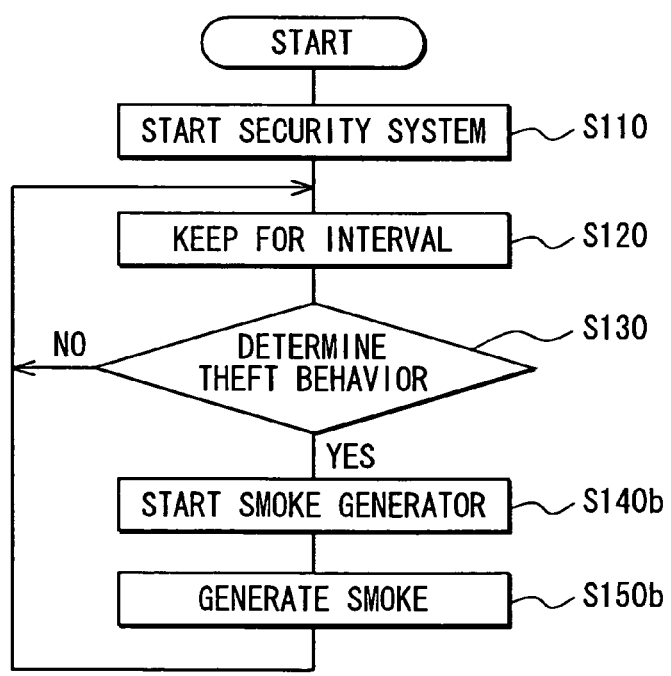
FIG. 3C is a flow chart showing an operation of the vehicle antitheft apparatus according to the third embodiment.

Next, an operation of the vehicle antitheft apparatus will be described with reference to a flow chart shown in FIG. 3C. Operations at step S110 to step S130 are similar to those in the first and second embodiments. When the theft behavior is sensed at step S130, the smoke generation controlling device 170 is operated (started) at step S140b, and the smoke is generated at step S150b. The smoke may be preferably generated for a predetermined period until the vehicle cabin is filled with the smoke. This may make it impossible for the theft person to reliably have a full view of the exterior of the vehicle from the driver's seat. Thus, this may discourage the theft person from stealing the vehicle.

As discussed above, in the vehicle antitheft apparatus of the present embodiment, when the theft behavior is sensed, the smoke is generated toward the interior and the exterior of the vehicle cabin. By generating the smoke outside of the vehicle, the sensing of the theft behavior can be recognized even at a location far away from the vehicle. Thus, this may effectively discourage the person from conducting the theft behavior. Also, the generation of the smoke inside the vehicle cabin may disable the theft person in the driver's seat to reliably have the full view of the exterior of the vehicle. Thus, this may discourage the theft person from stealing the vehicle.

Fourth Embodiment

Figure 4A:
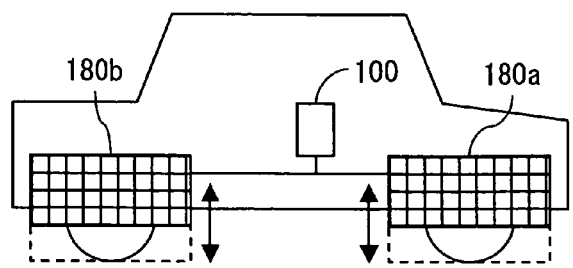
FIG. 4A is a schematic diagram of a vehicle antitheft apparatus having the theft sensing device and shutters according to a fourth embodiment of the present invention.
Figure 4B:
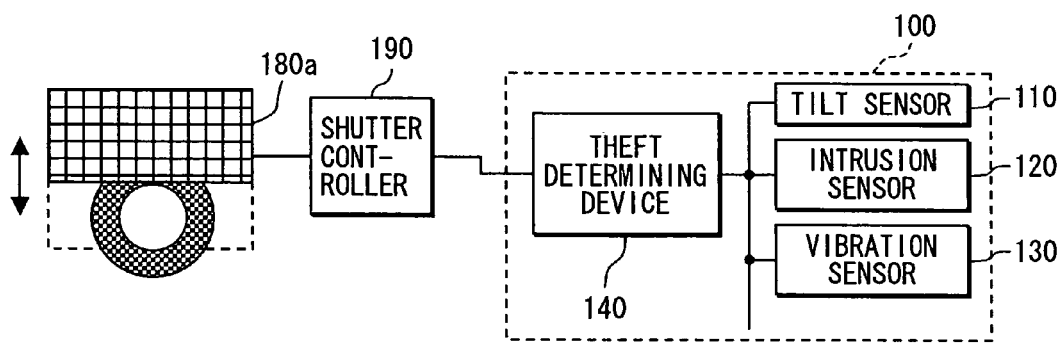
FIG. 4B is a block diagram showing the theft sensing device and a shutter controlling device.

The fourth embodiment of the present invention will be described with reference to accompanying drawings. Similar components of a vehicle antitheft apparatus of the present embodiment, which are similar to the components of the vehicle antitheft apparatus of the first to third embodiments, will be indicated by the same numerals. Also, explanation of the common point will be omitted and a different point from the above embodiments will be mainly described. As shown in FIGS. 4A and 4B, the vehicle antitheft apparatus of the present embodiment includes the theft sensing device 100, shutters 180a, 180b, and a shutter controlling device 190.

The theft sensing device 100 senses the theft behavior to the vehicle, and outputs the sensing result to the shutter controlling device 190. Then, the shutter controlling device 190 operates the shutters 180a, 180b based on the sensing result. FIG. 4B shows a structure of the theft sensing device 100 and the shutter controlling device 190. The structure of the theft sensing device 100 is similar to that of each of the first to third embodiments.

The shutter 180a, 180b is provided to each wheel of the vehicle, and is controlled to move vertically by the shutter controlling device 190. The shutter controlling device 190 operates the shutters 180a, 180b for limiting an object from intruding (entering) into a clearance between the vehicle and a ground when the sensing result of the theft determining device 140 indicates that the theft behavior is sensed. This limits a jack up behavior (behavior to jack up the vehicle).

Figure 4C:
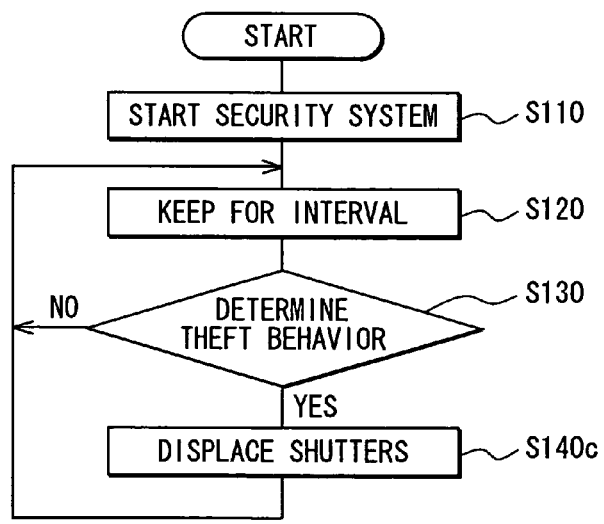
FIG. 4C is a flow chart showing an operation of the vehicle antitheft apparatus according to the fourth embodiment.

Next, an operation of the vehicle antitheft apparatus will be described with reference to a flow chart shown in FIG. 4C. Operations at step S110 to step S130 are similar to those in the first to third embodiments. When the theft behavior is sensed at step S130, the shutters 180a, 180b are displaced in a downward direction of the vehicle at step S140c. This limits the object from entering into the clearance between the vehicle and the ground.

As discussed above, in the vehicle antitheft apparatus of the present embodiment, when the theft behavior is sensed, the shutters 180a, 180b are operated for limiting the jack up of the vehicle. Due to this, the vehicle is limited from being towed. Thus, this may effectively discourage the person from stealing the vehicle.

A modification of the present embodiment will be described. For example, when the controlling device for controlling the suspension stroke by using the oil pressure or the air pressure is mounted to the vehicle, the stroke may be adjusted such that a minimum ground clearance of the vehicle is equal to or less than a predetermined elevation when the theft behavior is sensed. For example, the minimum ground clearance of the vehicle may be made so small that the vehicle cannot be jacked up. Then, the theft person, which is conducting the theft behavior, is discouraged from towing the vehicle.

Fifth Embodiment

Figure 5A:
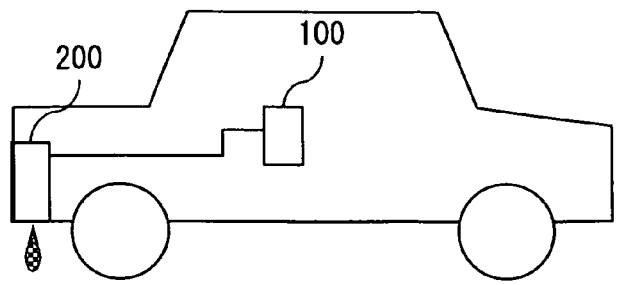
FIG. 5A is a schematic diagram of a vehicle antitheft apparatus having the theft sensing device and a marking device according to a fifth embodiment of the present invention.
Figure 5B:
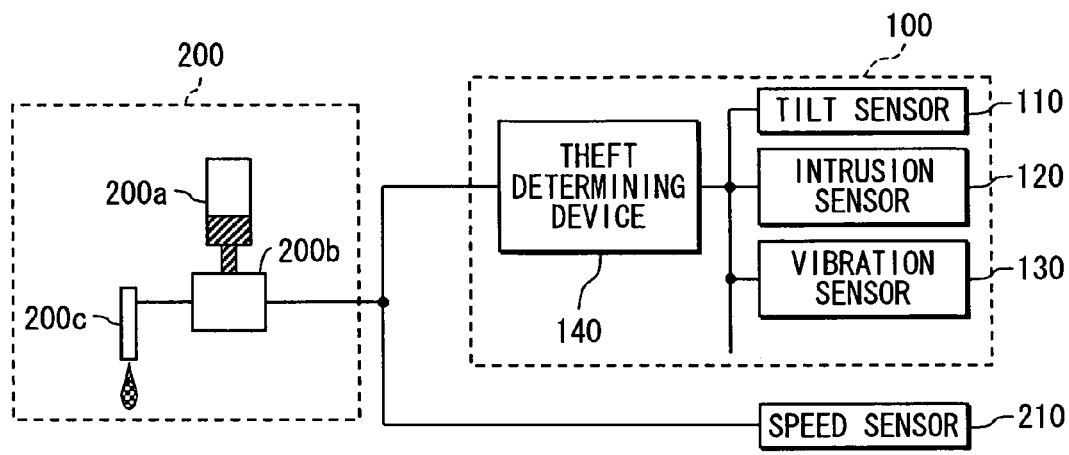
FIG. 5B is a block diagram showing the theft sensing device and the marking device shown in FIG. 5A.

The fifth embodiment of the present invention will be described with reference to accompanying drawings. Similar components of a vehicle antitheft apparatus of the present embodiment, which are similar to the components of the vehicle antitheft apparatus of the first embodiment, will be indicated by the same numerals. Also, explanation of the common point will be omitted and a different point from the first embodiment will be mainly described. As shown in FIGS. 5A and 5B, the vehicle antitheft apparatus of the present embodiment includes the theft sensing device 100, a marking device 200, and a speed sensor 210.

The theft sensing device 100 senses the theft behavior of the vehicle, and outputs the sensing result to the marking device 200. Then, the marking device 200 operates based on the sensing result. FIG. 5B shows a structure of the theft sensing device 100 and the marking device 200. The structure of the theft sensing device 100 is similar to that of the first embodiment.

The speed sensor 210 senses a speed of the vehicle, and outputs a sensing result to the marking device 200. The marking device 200 includes a paint tank 200a, a drop controlling device 200b, a drop nozzle 200c. The paint tank 200a stores paint that is dropped (injected) through the drop nozzle 200c. The paint may preferably include fluorescent paint or luminous paint, which irradiates ultraviolet rays to be luminous.

The drop controlling device 200b operates such that the paint in the paint tank 200a is dropped (injected) through the drop nozzle 200c when the sensing result of the theft determining device 140 indicates that the theft behavior is sensed, and also when the speed is equal to or more than a predetermined speed. For example, the drop nozzle 200c drops (injects) the paint, and a drop hole (injection hole) of the nozzle 200c faces a road surface (ground).

Figure 5C:
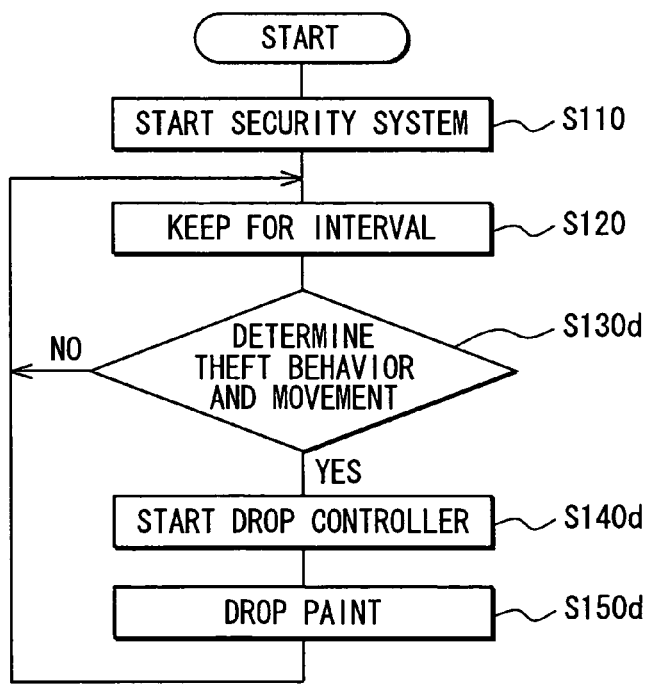
FIG. 5C is a flow chart showing an operation of the vehicle antitheft apparatus according to the fifth embodiment.

Next, an operation of the vehicle antitheft apparatus will be described with reference to a flow chart shown in FIG. 5C. Operations at step S110 to step S120 are similar to those in the first embodiment. At step S130d, it is determined whether the theft behavior is sensed and also whether the vehicle moves at a speed equal to or more than the predetermined speed or not. When a determining result is NO, process continues with step S120 to repeat the above process.

In contrast, when the determining result is YES at step 130d, control continues with step S140d, at which the drop controlling device 200b is operated (started). At step S150d, the paint is dropped (injected) through the drop nozzle 200c. The paint may be preferably dropped at a predetermine interval such that the paint in the paint tank 200a does not run out within a short period of time. Also, when the vehicle stops, the paint may preferably not be continuously dropped.

As discussed above, the vehicle antitheft apparatus of the present embodiment drops (injects) the paint toward the road surface when the theft behavior is sensed and the vehicle speed is equal to or more than the predetermined speed. Therefore, even when the vehicle is stolen, an escape route can be recognized based on the paint attached on the road surface. As a result, the vehicle may be effectively recovered.

Sixth Embodiment

Figure 6A:
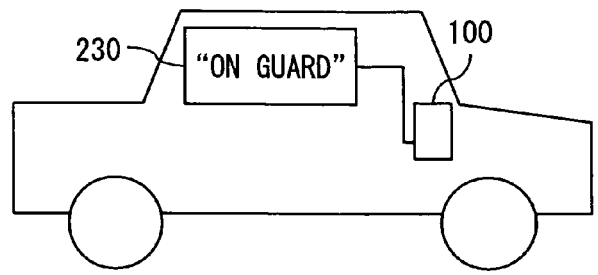
FIG. 6A is a schematic diagram of a vehicle antitheft apparatus having the theft sensing device and a window display device of according to a sixth embodiment of the present invention.
Figure 6B:
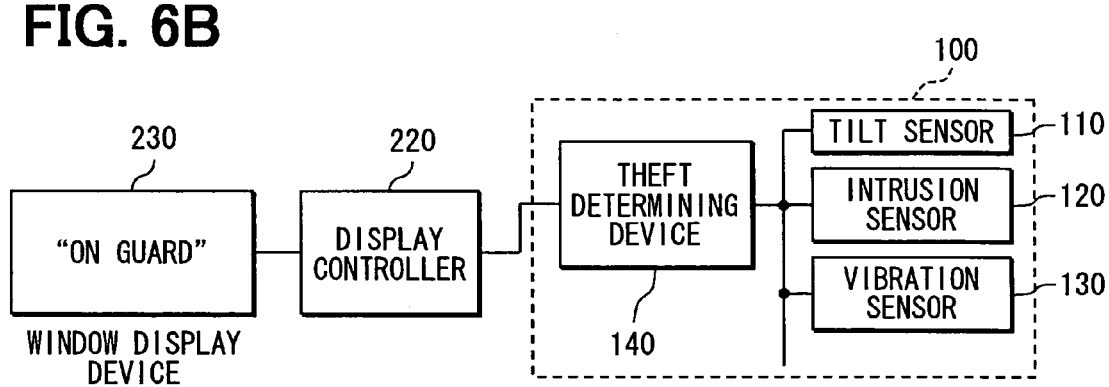
FIG. 6B is a block diagram showing the theft sensing device, a display controlling device, and the window display device.

The sixth embodiment of the present invention will be described with reference to accompanying drawings. Similar components of a vehicle antitheft apparatus of the present embodiment, which are similar to the components of the vehicle antitheft apparatus of the first to fifth embodiments, will be indicated by the same numerals. Also, explanation of the common point will be omitted and a different point from the embodiments will be mainly described. As shown in FIGS. 6A and 6B, the vehicle antitheft apparatus of the present embodiment includes the theft sensing device 100, the display controlling device 220, and a window display device 230.

The theft sensing device 100 senses the theft behavior to the vehicle, and outputs the sensing result to the display controlling device 220. Then, the display controlling device 220 controls indication of the window display device 230 (indication displayed by the window display device 230) based on the sensing result. As shown in FIG. 6B, the structure of the theft sensing device 100 is similar to that of each of the first to fifth embodiments.

The window display device 230 includes display regions located at a windshield, side windows, and a rear window. The indication displayed in the display regions is controlled by the display controlling device 220. The display controlling device 220 controls an operation, in which the window display device 230 displays that the vehicle is stolen (e.g., Now being Stolen), when the sensing result of the theft determining device 140 indicates that the theft behavior is sensed. Thus, a third party may be notified that the theft behavior is conducted.

Figure 6C:
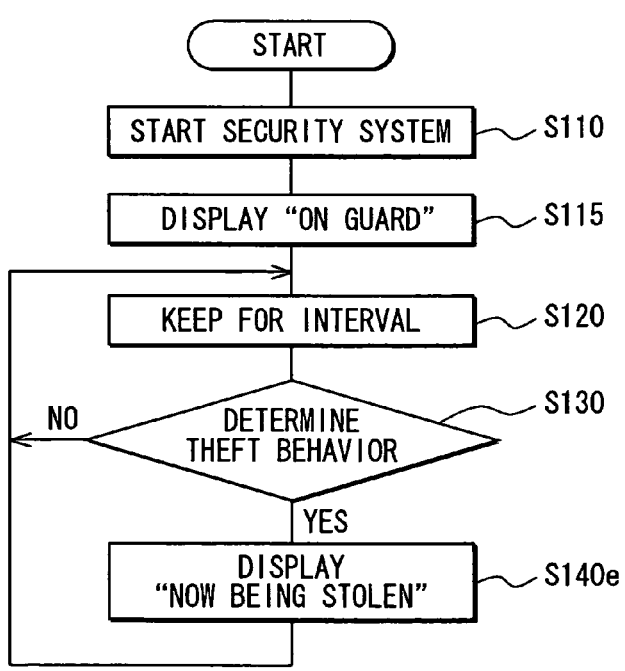
FIG. 6C is a flow chart showing an operation of the vehicle antitheft apparatus according to the sixth embodiment.

Next, an operation of the vehicle antitheft apparatus will be described with reference to a flow chart shown in FIG. 6C. Operations at step S110 to step S130 are similar to those in the first embodiment. At step S115, the window display device 230 displays the indication of "on guard" and the like. When the theft behavior is sensed at step S130, the window display device 230 displays the indication of "Now being Stolen" and the like at step S140e. Alternatively, the indication of the "Now being Stolen" may be irreversibly displayed by the window display device 230 using paint. Thus, in one embodiment, because the indication of "Now being Stolen" may be drawn in the display region on the window by the paint, the indication may not be disappeared easily.

Thus, the vehicle antitheft apparatus of the present embodiment controls the indication displayed by the window display device 230 when the theft behavior is sensed. This makes it possible to forcibly make the theft person recognize that an antitheft function of the vehicle is operated.

A modification of the present embodiment will be described. In the vehicle antitheft apparatus of the present embodiment, the indication displayed by the window display device 230 on the windshield (front window) may be alternatively controlled such that a light transmission of the windshield of the vehicle may be controlled to be equal to or less than a predetermined light transmission. This can obstruct a front view observed from the driver's seat. Thus, this may effectively discourage the person from stealing the vehicle.

Additional advantages and modifications will readily occur to those skilled in the art. The invention in its broader terms is therefore not limited to the specific details, representative apparatus, and illustrative examples shown and described.

What is claimed is:

1. An antitheft apparatus for a vehicle comprising:
   a theft behavior sensing device that senses a theft behavior to the vehicle; and
   an anti-jack-up device that limits the vehicle from being jacked up when the theft behavior sensing device senses the theft behavior.

2. The antitheft apparatus according to claim 1, wherein:
   the anti-jack-up device controls the suspension stroke of the vehicle; and
   the anti-jack-up device controls the suspension stroke such that a ground clearance of the vehicle is equal to or less than a predetermined length when the theft behavior sensing device senses the theft behavior.

3. The antitheft apparatus according to claim 1, wherein:
   the anti-jack-up device includes a shutter that limits an object from entering into a clearance between the vehicle and a ground.

* * * * *